United States Patent [19]

Sargeant

[11] Patent Number: 5,089,731

[45] Date of Patent: Feb. 18, 1992

[54] STATOR CORE VENT STRUCTURES

[75] Inventor: John B. Sargeant, Oviedo, Fla.

[73] Assignee: Westinghouse Electric Corp., Pittsburgh, Pa.

[21] Appl. No.: 660,078

[22] Filed: Feb. 25, 1991

[51] Int. Cl.$^5$ ............................ H02K 1/20; H02K 9/02
[52] U.S. Cl. ........................................ 310/65; 310/52; 310/64
[58] Field of Search ................... 310/64, 65, 58, 52, 310/216, 217

[56] References Cited

U.S. PATENT DOCUMENTS

| | | | |
|---|---|---|---|
| 580,011 | 4/1897 | Short | 310/65 |
| 630,930 | 8/1899 | Reist | 310/65 |
| 973,565 | 10/1910 | Reist | 310/64 |
| 1,241,503 | 10/1917 | Field | 310/65 |
| 2,486,798 | 11/1949 | Mollenhauer | 310/65 |
| 4,415,822 | 11/1983 | Aiba | 310/65 |
| 4,710,664 | 12/1987 | Cox et al. | 310/217 |

FOREIGN PATENT DOCUMENTS

| | | | |
|---|---|---|---|
| 344775 | 4/1960 | Switzerland | 310/64 |
| 1302383 | 4/1987 | U.S.S.R. | 310/58 |

Primary Examiner—Steven L. Stephan
Assistant Examiner—C. LaBalle

[57] ABSTRACT

In a stator core for a rotating electromagnetic machine, which core has two axial ends and at least one end shield at one axial end of the core, the end shield being composed of a plurality of thin plates at least one of which is a vent plate, and a vent structure supported by the vent plate, extending axially between the vent plate and an adjacent thin plate and presenting a plurality of radial flow passages for ventilating air, the vent structure is composed of: at least two elongate positioning members extending tranversely to the radial direction of the stator core, secured to the vent plate and having an axial dimension which is smaller than the axial distance between the vent plate and the adjacent thin plate; and a plurality of vent fingers extending generally in the radial direction of the core and held in position at least partially by the positioning members, each vent finger having an axial dimension equal to the axial distance between the vent plate and the adjacent thin plate and a cross section greater than that of each positioning member.

13 Claims, 2 Drawing Sheets

STATOR CORE VENT STRUCTURES

BACKGROUND OF THE INVENTION

1. Field of the Invention

The present invention relates to stator cores of the type having laminated end shields provided with radially-extending ventilation passages.

2. Prior Art

In various types of rotating machines, for example large turbine generators, each axial end of the stator core is provided with laminated end shields and these end shields must be formed to present radial ventilation passages for the flow of cooling air during generator operation.

Each end shield is composed of a plurality of thin plates, or laminations, and the conventional manner of forming ventilation passages is to secure generally radially extending vent fingers to one or more of these laminations. The vent fingers are attached to an associated lamination by a mechanical riveting connection. Typically, the lamination, or vent plate, is provided with a plurality of square openings and each end finger is provided with mating projections which extend through respective openings after which each projection is deformed, as by hammering, to, in effect, rivet each end finger to the associated vent plate.

Arrangements of this type present certain inherent drawbacks. For example, because of the manufacturing limitations, the size, and particularly the cross section, of each vent finger must be kept relatively small. However, vent fingers having a small cross section have a limited ability to resist the high clamping forces applied to hold the stator laminations and the end shield laminations together in a secure manner. It can occur that the requisite clamping forces will result in crushing of the vent fingers, particularly since all of the clamping forces must be transmitted by the vent fingers. Because of this localized compressive loading, the laminated end shield tends to flare, resulting in loosening of the laminations.

While each vent finger may be attached by spot welding, mechanical riveting of the type described above is generally preferred.

SUMMARY OF THE INVENTION

It is an object of the present invention to eliminate, or at least substantially minimize, the problems presented by conventional vent fingers.

Another object of the invention is to provide a ventilation structure composed of vent fingers having a higher resistance to compressive loading, while retaining the benefits of the conventional techniques for fastening the vent finger structure to a thin vent plate.

Another object of the invention is to provide a ventilation structure which can be assembled in a simpler manner than conventional structures.

Yet another object of the invention is to provide a ventilation structure which can be composed of radially extending vent fingers having a larger cross section than conventional vent fingers and which are thus capable of supporting higher compressive loads.

The above and other objects according to the invention are achieved, in a stator core for a rotating electromagnetic machine, which core has two axial ends and at least one end shield at one axial end of the core, the end shield being composed of a plurality of thin plates at least one of which is a vent plate, and a vent structure supported by the vent plate, extending axially between the vent plate and an adjacent thin plate and presenting a plurality of radial flow passages for ventilating air, by a vent structure composed of: at least two elongate positioning members extending transversely to the radial direction of the stator core, secured to the vent plate and having an axial dimension which is smaller than the axial distance between the vent plate and the adjacent thin plate; and a plurality of vent fingers extending generally in the radial direction of the core and held in position at least partially by the positioning members, each vent finger having an axial dimension equal to the axial distance between the vent plate and the adjacent thin plate and a cross section greater than that of each positioning member.

DESCRIPTION OF THE PREFERRED EMBODIMENTS

Figure 1:
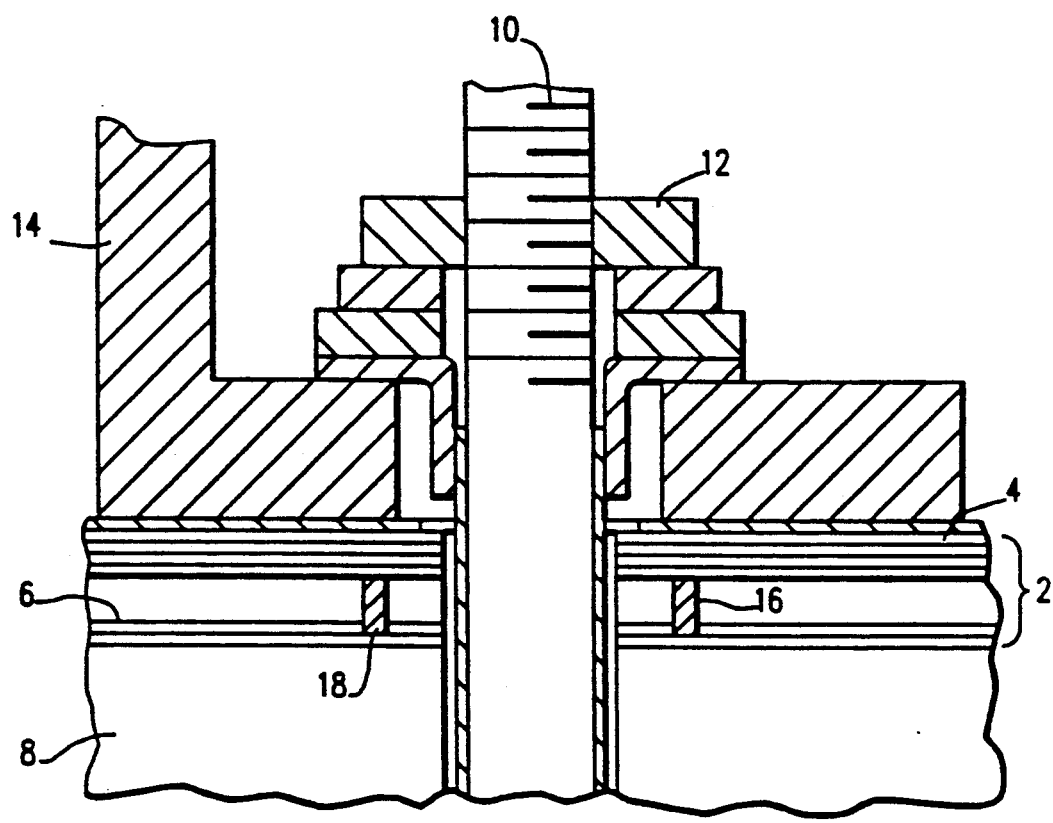
FIG. 1 is a cross-sectional detail view of a portion of an end shield for the stator of a large generator, the end shield being equipped with ventilation members according to the prior art.

A portion of an end shield and associated clamping members for a stator core structure which is typical of the prior art is shown in FIG. 1. End shield 2 is composed of a plurality of thin plates, or laminations, 4, one of which is a vent plate 6. The stator core further includes core laminations 8 and end shield 2 is disposed adjacent one axial end of the core assembly. An identical end shield is generally disposed adjacent the other axial end of the core assembly.

The two end shields and core laminations 8 are clamped together by axially extending through bolts 10, one of which is shown in FIG. 1. Generally, the through bolts are arranged in a circle around the machine shaft (not shown).

Each end of each bolt 10 is provided with a respective nut 12 and a clamping assembly including a clamping member 14 surrounds bolt 10 and is interposed between nut 12 and end shield 2. The other components of the clamping assembly will not be described in detail since they represent a conventional structure which acts to transmit clamping forces from nut 12 to end shield 2 and core laminations 8 while maintaining all components in the desired position.

In the illustrated structure, vent plate 6 carries a circular vent finger 16 which surrounds bolt 10. Vent finger 16 is secured to vent plate 6 by projections 18 which are fastened in mating openings in vent plate 6 in the manner described earlier herein. Vent plate 6 further carries a plurality of radially extending vent fingers (not shown) which are fastened to vent plate 6 in the same manner as circular finger 16. Circular finger 16 is provided primarily to absorb the axial compression forces transmitted to the stator assembly via clamping member 14.

Since all of the clamping forces must be transmitted by the vent fingers, and particularly circular vent finger 16, the vent fingers are subjected to high localized compressive forces. Since the size of the vent fingers, including vent fingers 16, is limited, in part by the fact that they are positively secured only to relatively thin vent plate 6, the vent fingers are prone to experience crushing, particularly if the axial clamping forces are not carefully controlled.

Figure 2:
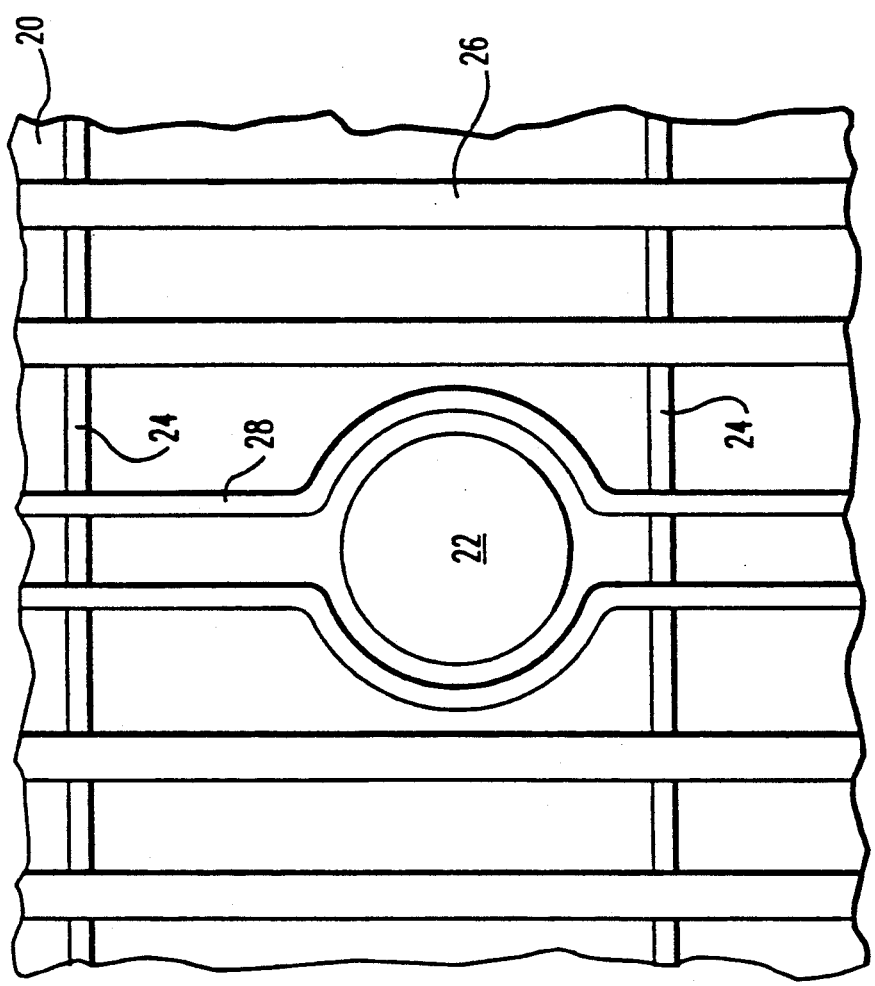
FIG. 2 is a plan view of one embodiment of a vent structure according to the present invention.
Figure 3:
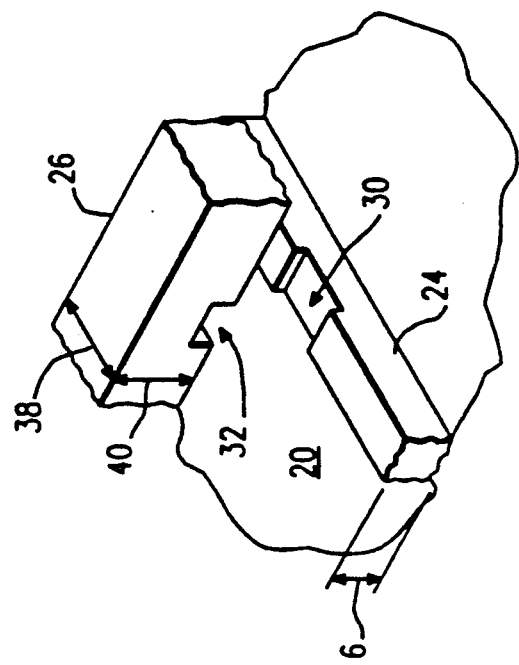
FIG. 3 is a perspective detail view of an exemplary portion of the structure of FIG. 2.

In order to obviate the limitations imposed by conventional vent fingers, the present invention provides a novel vent structure, one preferred embodiment of which is shown in FIGS. 2 and 3. The vent structure shown in FIGS. 2 and 3 is carried by a vent plate 20 which, in an end shield, performs the same function as vent plate 6 of FIG. 1. Vent plate 20 is provided with a plurality of passages 22, one of which is shown in FIG. 2, each passage 22 being provided for a respective through bolt 10.

According to the invention, vent plate 20 carries at least two positioning members 24 each of which extends generally in the circumferential direction of the stator and each of which is fastened to vent plate 6 in the manner previously employed for fastening vent fingers to a vent plate, for example as shown with respect to vent finger 16 in FIG. 1. Each positioning member 24 may have a cross section similar to that provided for prior art vent fingers 16.

The vent structure according to the present invention further includes a plurality of vent fingers, including straight vent fingers 26 and vent fingers 28 having an arcuate portion which surrounds passage 22. Each vent finger 26, 28 is held in place by positioning members 24 in that each positioning member 24 is provided with a plurality of notches 30 dimensioned to mate with corresponding notches 32 in vent fingers 26 and 28.

If found to be desirable or necessary, vent fingers 26 and 28 can be held in place during stator core assembly by a light adhesive at the locations where notches 30 engage notches 32. Vent fingers 26 and 28 need be held in place in this manner only until the end shield is completely assembled, after which vent fingers 26 and 28 will be securely held in place, between vent plate 6 and the thin plate 4 at the other side of the vent passages, by compressive forces.

Referring particularly to FIG. 3, positioning members 24 have a relatively small cross section and a height 36, in the axial direction the stator, which is substantially smaller than the axial spacing between the plates 4 and 6 bordering the vent passages. On the other hand, each vent finger 26 and 28 has a substantially larger cross section, i.e., a greater width 38 and/or height 40, than do positioning members 24. In particular, the height 40 of each finger 26, 28 is equal to the axial spacing between the plates 4 and 6 which border the vent passages, the depths of notches 30 and 32 being such that each vent finger 26 and 28 contacts the last-mentioned plates 4 and 6 in order to serve as the members which transmit compressive forces therebetween. Thus, relatively thin positioning members are relieved of the task of transmitting such compression forces.

Thus, the structure according to the present invention successfully eliminates the problem of localized crushing of vent fingers and lamination flare in the end shield, while permitting the mounting of the vent fingers to be achieved by the existing riveting technology.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a stator core for a rotating electromagnetic machine, which core has two axial ends and at least one end shield at one axial end of the core, the end shield being composed of a plurality of thin plates at least one of which is a vent plate, and a vent structure supported by the vent plate, extending axially between the vent plate and an adjacent thin plate and presenting a plurality of radial flow passages for ventilating air, the improvement wherein said vent structure comprises: at least two elongate positioning members extending transversely to the radial direction of said stator core, secured to said vent plate and having an axial dimension which is smaller than the axial distance between said vent plate and said adjacent thin plate; and a plurality of vent fingers extending generally in the radial direction of said core and held in position at least partially by said positioning members, each said vent finger having an axial dimension equal to the axial distance between said vent plate and said adjacent thin plate and a cross section greater than that of each said positioning member, and each said vent finger having a width, perpendicular to the axial dimension and parallel to said vent plate, greater than the width of each said positioning member.

2. A stator core as defined in claim 1 wherein each said vent finger contacts said vent plate and said adjacent thin plate for transmitting axial compression forces therebetween.

3. A stator core as defined in claim 1 wherein each said vent finger and each said positioning member is provided with a plurality of notches via which said vent fingers are held in position by said positioning members.

4. A stator as defined in claim 3 wherein said notches are arranged to fix each vent finger in position in all directions parallel to said vent plate.

5. A stator as defined in claim 4 wherein said positioning members are riveted to said vent plate.

6. A stator core as defined in claim 2 wherein each said vent finger and each said positioning member is provided with a plurality of notches via which said vent fingers are held in position by said positioning members.

7. A stator as defined in claim 6 wherein said notches are arranged to fix each vent finger in position in all directions parallel to said vent plate.

8. A stator as defined in claim 1 wherein said positioning members are riveted to said vent plate.

9. In a stator core for a rotating electromagnetic machine, which core has two axial ends and at least one end shield at one axial end of the core, the end shield being composed of a plurality of thin plates at least one of which is a vent plate, and a vent structure supported by the vent plate, extending axially between the vent plate and an adjacent thin plate and presenting a plurality of radial flow passages for ventilating air, the improvement wherein said vent structure comprises: at least two elongate positioning members extending transversely to the radial direction of said stator core, secured to said vent plate and having an axial dimension which is smaller than the axial distance between said vent plate and said adjacent thin plate; and a plurality of vent fingers extending generally in the radial direction of said core and held in position at least partially by said positioning members, each said vent finger having an axial dimension equal to the axial distance between said vent plate and said adjacent thin plate and a cross section greater than that of each said positioning member, and each said vent finger and each said positioning member having a plurality of notches via which said vent fingers are held in position by said positioning members.

10. A stator core as define din claim 9 wherein each said vent finger contacts said vent plate and said adjacent thin plate for transmitting axial compression forces therebetween.

11. A stator core as defined in claim 9 wherein said notches are arranged to fix each vent finger in position in all directions parallel to said vent plate.

12. A stator core as defined in claim 9 wherein each said vent finger has a width, perpendicular to the axial dimension and parallel to said vent plate, greater than the width of each said positioning member.

13. A stator as defined in claim 9 wherein said positioning members are riveted to said vent plate.

* * * * *